United States Patent [19]

Carlson

[11] Patent Number: 5,054,206

[45] Date of Patent: Oct. 8, 1991

[54] CHAIN SAW PROJECTION MENSURATION METHOD AND APPARATUS FOR DETERMINING THE DIAMETER OF TREES

[76] Inventor: Robert A. Carlson, 2221 McDougal, Everett, Wash. 98201

[21] Appl. No.: 337,953

[22] Filed: Apr. 14, 1989

[51] Int. Cl.[5] .................................................. G01B 5/08
[52] U.S. Cl. ...................................... 33/555.1; 33/277; 33/485
[58] Field of Search .................. 33/276, 277, 284, 285, 33/178 R, 555.1, 483, 485, 494; 30/381, 382; 7/150

[56] References Cited

FOREIGN PATENT DOCUMENTS

| 87512 | 10/1895 | Fed. Rep. of Germany | 33/277 |
| 617283 | 5/1934 | Fed. Rep. of Germany | 33/277 |
| 181352 | 11/1962 | Sweden | 33/555.1 |

Primary Examiner—Harry N. Haroian

[57] ABSTRACT

A projection scale apparatus and method uses a projection scale on the chain guide of a chain saw. The throttle of the chain saw may be continuously manipulated to prevent the saw from stalling while the diameter of a tree is measured with a scale provided on the chain guide.

8 Claims, 3 Drawing Sheets

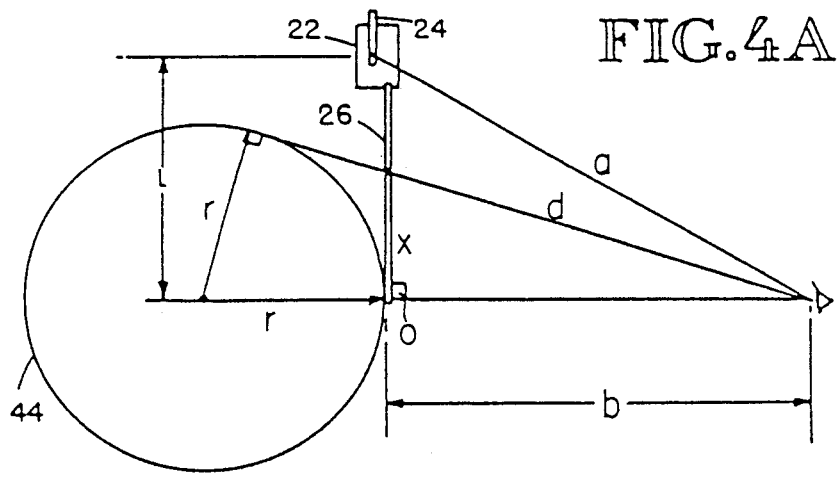
FIG.4A
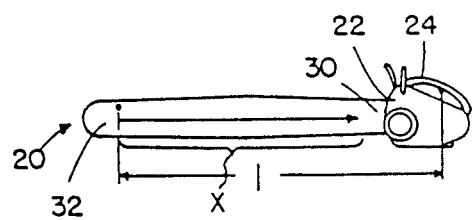
FIG.4B
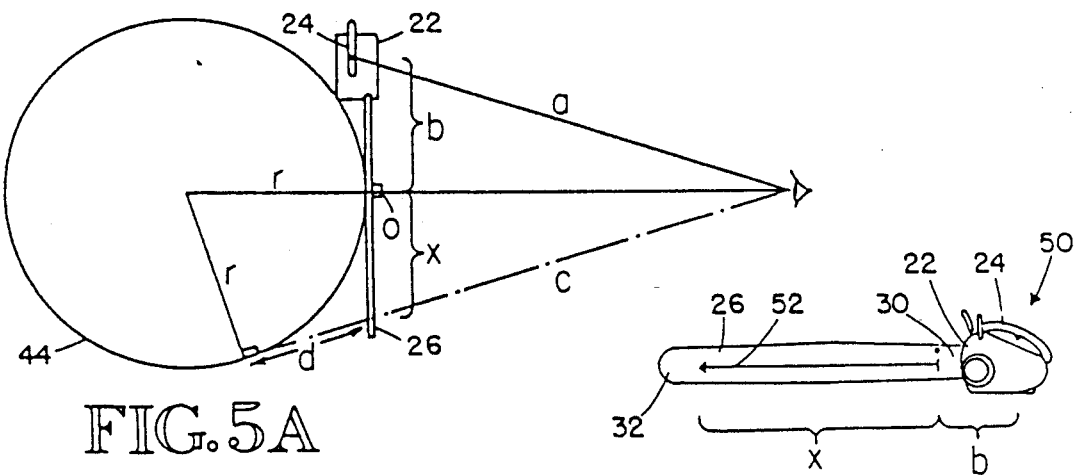
FIG.5A
FIG.5B

CHAIN SAW PROJECTION MENSURATION METHOD AND APPARATUS FOR DETERMINING THE DIAMETER OF TREES

TECHNICAL FIELD

The invention relates to projection mensuration devices and apparatus. More specifically, the invention relates to methods and apparatus for measuring the diameter of trees by projection.

BACKGROUND OF THE INVENTION

The gradation of standing timber is an important step in harvesting timber. The value of standing timber must be appraised to determine the stumpage value of a forest. Stumpage value is the value of the sale price of the standing timber. Stumpage value is determined by ascertaining the volume of the timber and the grade of the timber which is subtracted from the cost of growing, harvesting, and transporting the timber to market. The stumpage value is typically determined per thousand board feet of timber.

The harvesting of timber is generally done by clear cutting all standing trees within a given area, called a timber sale. The trees are felled, cut, bucked, and cut into logs. The log volume is determined by considering the minimum tree diameter, the top diameter, and the length in feet. The log is then given a grade based on the minimum diameter (top diameter). Log grades determine the value of each log, as logs are sold by grade. Log grades for Douglas Fir trees range from a #4 saw log, which has a minimum diameter requirement of less than 6 inches, to a #1 peeler log (suitable for peeling veneer), with a minimum diameter of 30 inches. There are three other grades for Douglas Fir trees, which are: #3 saw log, with a minimum diameter of 6 inches; #2 saw log, with a minimum diameter of 12 inches; and special mill log, with a minimum diameter of 16 inches. The value of each grade increases rapidly. Thus, there is a need for the timber cutter to quickly ascertain the proper diameter before a felled tree is cut into logs.

As stated above, during harvesting, and after a tree is felled, the timber cutter must quickly determine the diameter of the tree to see if it falls within a desired range or grade. Presently, timber cutters use a Biltmore Projection Scale which permits the direct reading of the diameter of the tree from a projection measurement. FIG. 1 shows a Biltmore scale 10 in use by a timberman 12 prior to the felling of a tree 14.

The Biltmore scale consists of a straight rule having an origin 16 at the center thereof. The timberman 12 is presumed to have a typical arm length 18 of approximately 25 inches. The scale 10 has a plurality of markings increasing in magnitude to the left and to the right of the origin 16. The timberman sights across the scale 10 to the perimeter of the tree 14 and reads the corresponding measurement on either side of the origin 16. The measurements are positioned a distance "x" from the origin such that when the origin of the scale is positioned tangent to the circumference of the tree and the distance from the eye of the observer to the origin of the scale is approximately 25 inches, the projected tree diameter can be read off either side of the scale. The projection of the tree diameter on to the scale gives a true reading of the tree diameter.

By the law of similar triangles and the Pythagorean theorem, the distance "x" from the origin at which markings corresponding to the tree diameter should be selected is defined by the following equation:

$$x = \frac{Da^{\frac{1}{2}}}{2(a+D)^{\frac{1}{2}}}$$

where a=25 inches and D equals a range of tree diameters.

Use of the Biltmore scale shown in FIG. 1 is very inconvenient for the timberman. As a result thereof, timbermen tend not to use the scale and merely judge or estimate the diameter of the tree. Consequently, inaccurate gradation of timber occurs and trees of the wrong diameter are often felled. The Biltmore scale is particularly inconvenient to use for two reasons. First, the scale itself is unwieldy because of its length of approximately 30 inches. When manufactured in a foldable form, the scale must, of course, be unfolded prior to use. A more perplexing second problem involves the cooperative use of the Biltmore scale with a chain saw prior to the felling of a tree. Gas-powered chain saws are commonly used by modern timbermen to fell large trees. Operation of the chain saw after the engine has warmed up requires continuous attention to prevent stalling. Specifically, the chain saw engine tends to stall unless the throttle is regularly operated to maintain the engine at a minimum rpm. In particular, if the chain saw is set down, such as to pick up and use a Biltmore scale, the chain saw may stall and require restarting. Hot chain saws are notoriously balky on restarting and may, in fact, not restart until the engine has cooled sufficiently.

For these reasons, the Biltmore scale is not always used by timbermen to grade trees before felling. This results in waste and inefficient cutting of timber.

Therefore, a need exists for a tree diameter projection scale which can be used without directing the timberman's attention away from operation of the chain saw at idle.

SUMMARY OF THE INVENTION

It it therefore an object of the present invention to provide a tree diameter projection scale for use with a chain saw.

It is yet another object of the present invention to provide a tree diameter projection scale on the chain saw itself without affecting the normal cutting operation of the chain saw.

These objects, and other objects and advantages of the invention which will become apparent from the following description, are achieved by providing a chain saw having a main body with a handle for holding the chain saw, a chain guide having a root section connected to the main body near the handle and a tip section at a distance therefrom with projection markings on the chain guide for projecting the diameter of a tree along a sight line to the chain guide.

In the preferred embodiment, the projection markings comprise a measurement scale on the chain guide having an origin either adjacent to the root section of the chain guide, or adjacent to the tip section of the chain guide. The chain saw is continually held by its handle, even during measurement of tree diameters, which permits the operator to continuously operate the throttle and prevent the chain saw from stalling. The incremental markings on the scale are positioned so as to compensate for the distance between the hand holding the chain saw and the origin of the scale.

BRIEF DESCRIPTION OF THE DRAWINGS

FIGS. 4a & 4b are free body diagrams of the first embodiment of the invention shown in FIG. 3.

FIGS. 5a & 5b are free body diagrams of a second embodiment of the invention having the origin of the scale adjacent to the root section of the chain guide.

BEST MODE FOR CARRYING OUT THE INVENTION

Figure 1:
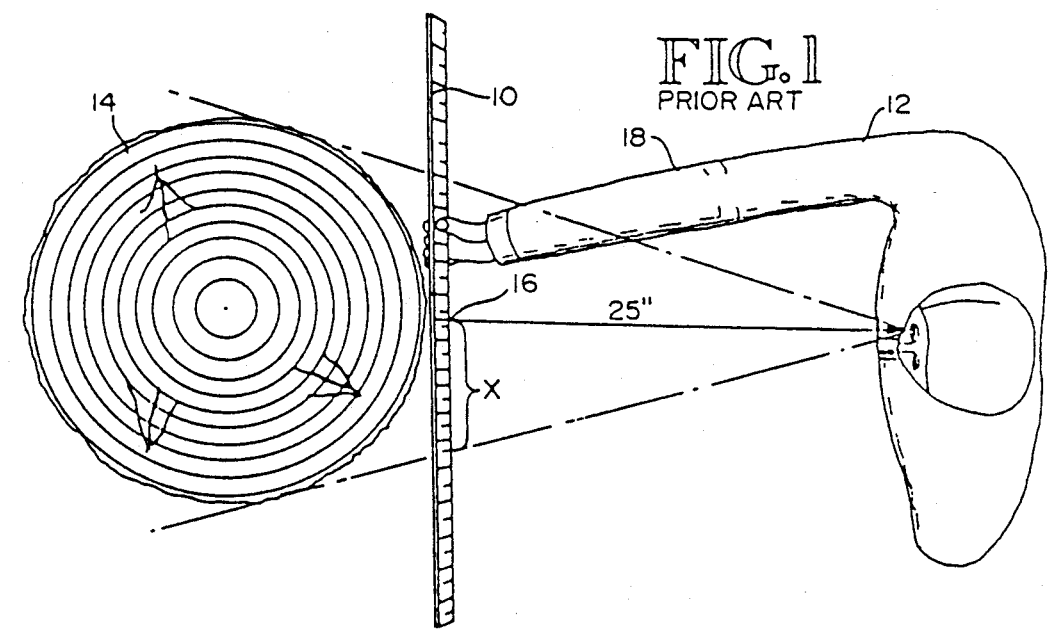
FIG. 1 is a schematic top plan view of a conventional Biltmore projection scale in use.
Figure 2:
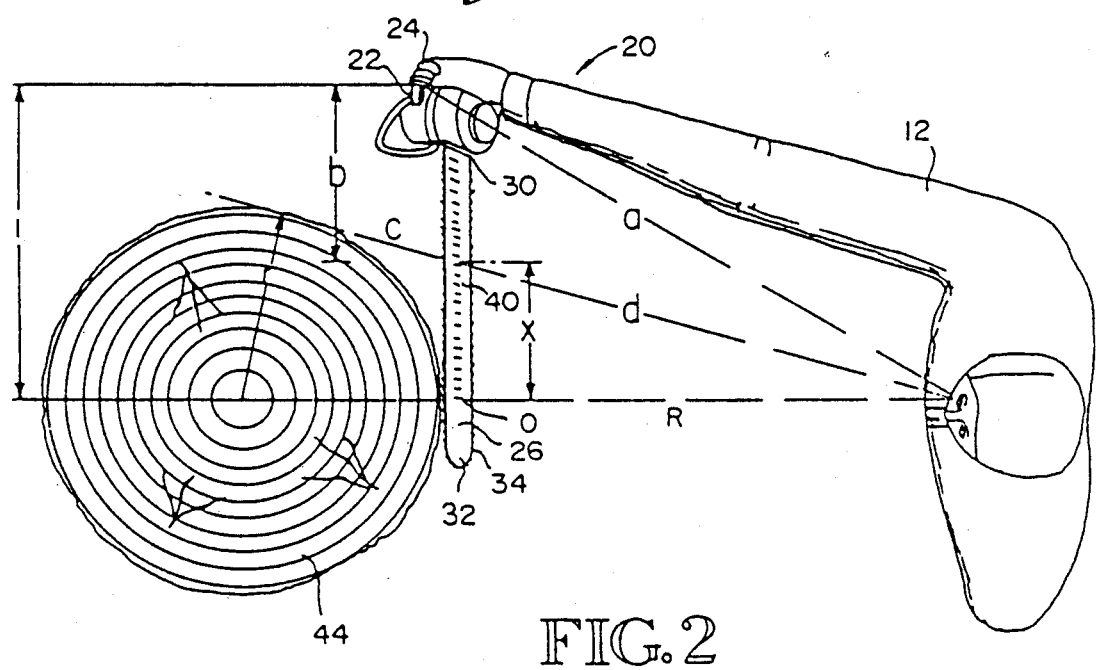
FIG. 2 is a schematic top plan view of a first embodiment of the invention having the origin of the scale adjacent to the tip of the chain saw guide. The figure includes a diagrammatic sketch of various measurements used in determining a formula for the measurements on the scale.

A first embodiment of the chain saw projection mensuration device is generally indicated at reference numeral 20 in FIG. 2. This embodiment has a conventional gas-operated engine 22 having a handle 24 and chain guide 26. The guide has a root section 30 adjacent to the handle 24 and a tip section 32 at the far end of the chain guide. The chain guide rotatably supports a cutting chain 34 which operates in a manner well known to those of ordinary skill in the art.

The chain guide 26 has attached thereto a projection scale 40 having an origin "o" adjacent to the tip section 32. The projection scale has a plurality of markings having increasing magnitude in the direction of the root section 30. In use, the timberman 12 positions the origin "o" of the projection scale 40 against the center of a tree to be measured 44. The chain guide 26 is positioned so as to be substantially tangent to the radius "r" of the tree while the timberman maintains an awareness of the idle speed of the engine 22 so as to operate the throttle on the handle 24 if necessary and prevent the engine from stalling. The operator sights along the circumference of the tree and reads the measurement from the projection scale 40 which intersects his sight line to the tree perimeter. This measurement designated by position "x" on the scale corresponds to the diameter of the tree.

Figure 3:
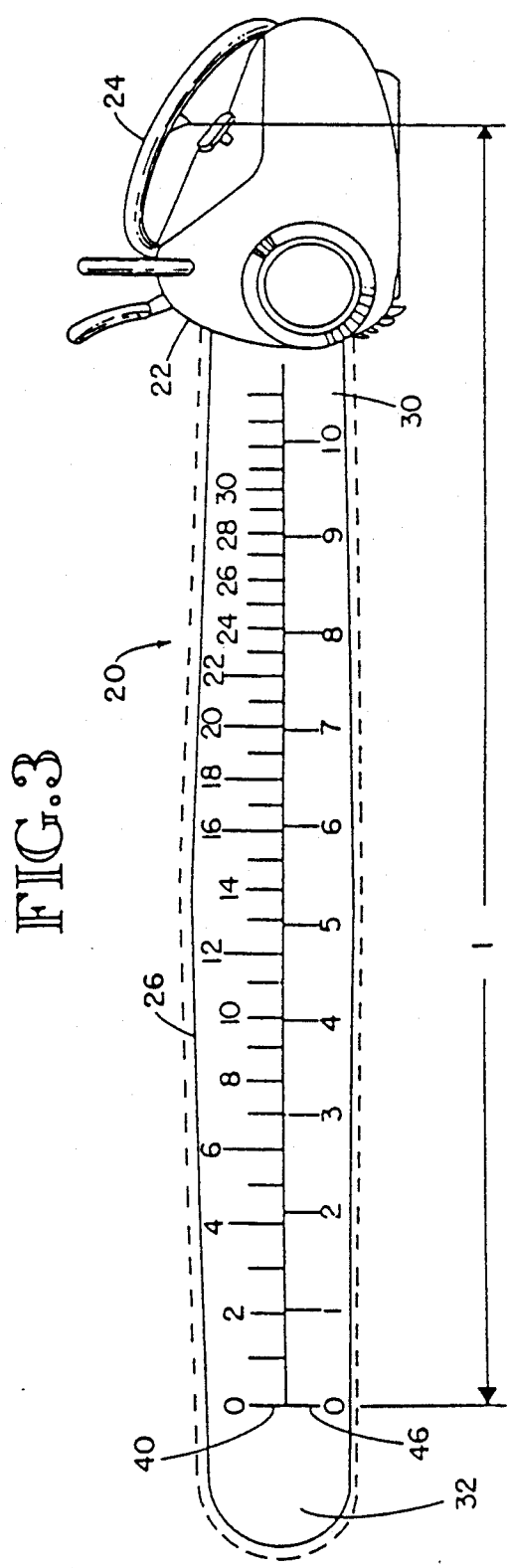
FIG. 3 is a side elevational view of a chain saw having markings corresponding to the geometry of FIG. 2.

FIG. 4 is a free body diagram illustrating the geometric relationships shown in FIG. 3. In both FIGS. 3 and 4, "a" is the approximate length of the timberman's arm (approximately 25 inches), "r" is the radius of the tree, $D=2r$ and is the diameter of the tree, "x" is the projected tree diameter on the projection scale 40, "o" is the origin of the scale, and "l" is the distance from the center of the handle 24 to the origin "o" of the scale. The following geometric analysis determines the position "x" at which measurements corresponding to the diameter of the tree should be positioned on the projection scale 40.

By the law of similar triangles, $$\frac{x}{b} = \frac{r}{d+c} \qquad (1)$$

$$x = \frac{br}{d+c}$$

By the Pythagorean theorem, $$b = (a^2 - l^2)^{\frac{1}{2}} \qquad (2)$$

and $$d+c = [(b+r)^2 - r^2]^{\frac{1}{2}} = (b^2 + 2br)^{\frac{1}{2}} \qquad (3)$$

Combining equations 1 and 3, $$x = \frac{br}{b^{\frac{1}{2}}(b+2r)^{\frac{1}{2}}} = \frac{rb^{\frac{1}{2}}}{(b+2r)^{\frac{1}{2}}} \qquad (4)$$

therefore, $x = \dfrac{Db^{\frac{1}{2}}}{2(b+D)^{\frac{1}{2}}}$ where $b = (a^2 - l^2)^{\frac{1}{2}}$ Table A below has been prepared from equation (4) for a variety of tree diameters, where the length "l" from the origin of the scale, "o" to the center of the handle 24 is 22 inches (a 16-inch chain guide having a root section at a distance of approximately 6 inches from the center of the handle has been selected for "l") and where "a", (the length of the timberman's arm) is 25 inches.

TABLE A (FIGS. 2, 3 and 4, origin adjacent to the tip section of the chain guide)

| Tree diameter in inches | Corresponding distance on scale (x) from origin |
|---|---|
| 6 | 2.445 |
| 8 | 3.092 |
| 10 | 3.684 |
| 12 | 4.231 |
| 14 | 4.742 |
| 16 | 5.221 |
| 18 | 5.674 |
| 20 | 6.104 |
| 22 | 6.513 |
| 24 | 6.904 |
| 26 | 7.279 |
| 28 | 7.640 |
| 30 | 7.988 |
| 32 | 8.324 |

FIG. 3 is a side elevational view of the first embodiment 20 of the device. The projection scale 40 appears in the upper part of the chain guide 26 while the lower part of the chain guide contains a conventional inch scale 46. The markings shown on the scale 40 are permanently etched, ground or introduced onto the scale during the forging process. Any form of depositing the markings on the scale is satisfactory, as long as the markings are permanent.

FIG. 5 illustrates a second embodiment 50 of the invention in which the origin "o" of the scale is located adjacent to the root section 30 of the scale 52. In this embodiment, the scale 52 has a plurality of markings similar to the embodiment shown in FIGS. 2 through 4, except the measurements increase in magnitude towards the tip section 32 of the chain guide 26 other than towards the root section 30. In FIG. 5, "a" equals the approximate length of the timberman's arm (approximately 25 inches), "r" equals the radius of the tree, "D"=2r and is the diameter of the tree, "x" is the projected tree diameter on the scale, "o" designates the origin of the scale 52, and "b" is the distance from the center of the handle 24 to the origin of the scale 52. With reference to the free body diagram of FIG. 5 and by the law of similar triangles, $$\frac{x}{c} = \frac{r}{k+r} \quad (1)$$

$$x = \frac{rc}{k+r} \quad (2)$$

By the Pythagorean theorem, $$k = (a^2 - b^2)^{\frac{1}{2}} \quad (3)$$

and $$c = (k^2 + x^2)^{\frac{1}{2}} \quad (4)$$

Combining equations 2 and 4, $$x = \frac{r(k^2 + x^2)^{\frac{1}{2}}}{k+r}$$

Multiplying both sides by $(k+r)$ and squaring both sides of the equation gives $$x^2(k+r)^2 = r^2(k^2 + x^2)$$

expanding all terms on both sides of the equation gives $$x^2 k^2 + 2x^2 kr + x^2 r^2 = r^2 k^2 + r^2 x^2$$

cancelling common terms and solving for $x^2$ gives $$x^2 = \frac{r^2 k^2}{k + 2r}$$

because $r = D/2$, $x = D/2 \left[\dfrac{k}{k+D}\right]^{\frac{1}{2}}$ \quad (5)

where $k = (a^2 - b^2)^{\frac{1}{2}}$. \quad (6)

Table B has been prepared, where "a" equals 25 inches and "b" equals 6 inches. Table B gives the distances from the origin at which markings for corresponding tree diameters should be positioned.

TABLE B (Second embodiment, origin adjacent to tip section of chain guide)

| Tree diameter in inches | Corresponding distance on scale (x) from origin |
|---|---|
| 6 | 2.686 |
| 8 | 3.469 |
| 10 | 4.208 |
| 12 | 4.908 |
| 14 | 5.574 |
| 16 | 6.211 |
| 18 | 6.820 |
| 20 | 7.404 |
| 22 | 7.967 |
| 24 | 8.509 |
| 26 | 9.033 |
| 28 | 9.540 |
| 30 | 10.031 |
| 32 | 10.508 |

When using the second embodiment 55 of the invention, the timberman should hold the origin "o" of the scale 52 approximately at the center of the tree 44 with the chain guide 26 substantially tangent to the circumference of the tree. The timberman should then sight along the edge of the tree and read the marking off of the projection scale 52 where his sight line intersects the chain guide 26. In this manner, the trigger on the handle 24 can be operated if necessary to prevent the chain saw from stalling.

Other embodiments and variations of the invention are contemplated. Therefore, the invention is not to be limited by the above description but is to be determined in scope by the claims which follow.

I claim:

1. A projection mensuration apparatus for estimating the diameter of a tree, comprising:

a chain saw having a main body with a handle for holding the chain saw, a chain guide having a root section connected to the main body near the handle and a tip section at a distance therefrom, and a cutting chain rotatably supported by the chain guide; and projection means on the chain guide for projecting the diameter of the tree along a sight line to the chain guide, including a scale having an origin adjacent to the tip of the chain guide and a plurality of markings, increasing in magnitude in the direction of the root section which substantially satisfy the following equations:

$$x = \frac{Db^{\frac{1}{2}}}{2(b+D)^{\frac{1}{2}}}$$

and $$b = (a^2 - l^2)^{\frac{1}{2}}$$

where "x" is the distance from the origin on the scale which corresponds to the diameter of the tree projected thereon, "a" is the approximate length of a user's arm, "l" is the approximate distance from the center of the handle to the origin of the scale, and D is the approximate diameter of the tree which has been measured, so that by holding the handle of the chain saw with one hand at arm's length and positioning the tip section on the circumference of the tree with the chain guide tangent thereto, the edge of the tree can be sighted along the guide and the projected diameter of the tree read therefrom.

2. The projection mensuration apparatus of claim 1, wherein a=25 inches.

3. The projection mensuration apparatus of claim 2, wherein l=22 inches.

4. A projection mensuration apparatus for estimating the diameter of a tree, comprising:

a chain saw having a main body with a handle for holding the chain saw, a chain guide having a root section connected to the main body near the handle and a tip section at a distance therefrom, and a cutting chain rotatably supported by the chain guide; and projection means on the chain guide for projecting the diameter of the tree along a sight line to the chain guide, including a scale having an origin adjacent to the root section of the chain guide and a plurality of markings, increasing in magnitude in the direction of the tip section which substantially satisfy the following equations:

$$x = \frac{Dk^{\frac{1}{2}}}{2(k+D)^{\frac{1}{2}}}$$

and $$k = (a^2 - b^2)^{\frac{1}{2}}$$

where "x" is the distance from the origin on the scale which corresponds to the diameter of the tree projected thereon, "a" is the approximate length of a user's arm, "b" is the approximate distance from the center of the handle to the origin of the scale, and D is the approximate diameter of the tree which has been measured, so that by holding the handle of the chain saw with one hand at arm's length and positioning the root section on the circumference of the tree with the chain guide tangent thereto, the edge of the tree can be sighted along the guide and the projected diameter of the tree read therefrom.

5. The projection mensuration apparatus of claim 4, wherein a=25 inches.

6. The projection mensuration apparatus of claim 5, wherein b=6 inches.

7. A method for determining the diameter of a tree, comprising the steps of:

providing a chain saw having a handle and a chain guide having root and tip sections with a scale thereon, the scale having an origin adjacent to the tip section of the chain guide and a plurality of markings, increasing in magnitude in the direction of the root section which substantially satisfy the following equations:

$$x = \frac{Db^{\frac{1}{2}}}{2(b + D)^{\frac{1}{2}}}$$

and $$b = (a^2 - l^2)^{\frac{1}{2}}$$

where "x" is the distance from the origin on the scale which corresponds to the diameter of the tree to be projected thereon, "a" is the approximate length of a user's arm, "l" is the approximate distance from the center of the handle to the origin of the scale, and D is the approximate diameter of the tree which is to be measured;

holding the chain saw by the handle thereof at arm's length;

positioning the tip section of the chain saw against the approximate center of the tree with the chain guide tangent thereto;

sighting along the edge of the tree and across the chain guide; and reading the projected diameter of the tree from the scale.

8. A method for determining the diameter of a tree, comprising the steps of:

providing a chain saw having a handle and a chain guide having root and tip sections with a scale thereon, the scale having an origin adjacent to the root section of the chain guide and a plurality of markings, increasing in magnitude in the direction of the tip section which substantially satisfy the following equations:

$$x = \frac{Dk^{\frac{1}{2}}}{2(k + D)^{\frac{1}{2}}}$$

and $$b = (a^2 - b^2)^{\frac{1}{2}}$$

where "x" is the distance from the origin on the scale which corresponds to the diameter of the tree to be projected thereon, "a" is the approximate length of a user's arm, "b" is the approximate distance from the center of the handle to the origin of the scale, and D is the approximate diameter of the tree which is to be measured;

holding the chain saw by the handle thereof at arm's length;

positioning the root section of the chain saw against the approximate center of the tree with the chain guide tangent thereto;

sighting along the edge of the tree and across the chain guide; and reading the projected diameter of the tree from the scale.

* * * * *